Feb. 6, 1945.  R. SCHUMANN  2,368,888
SMALL ELECTRIC MACHINE TOOL
Filed June 27, 1941

Inventor
Robert Schumann
By Bryant & Lowry
Attorneys.

Patented Feb. 6, 1945

2,368,888

UNITED STATES PATENT OFFICE 2,368,888

SMALL ELECTRIC MACHINE TOOL

Robert Schumann, Racine, Wis., assignor, by mesne assignments, to Anne R. Schumann, Racine, Wis.

Application June 27, 1941, Serial No. 400,117
In Germany February 12, 1938

3 Claims. (Cl. 64—11)

The invention relates to small electric machine tools which are used for milling, grinding, drilling and the like, and has for its object the connection of the shaft of the driving engine with the cutting spindle.

By the invention a connection between motor shaft and cutting spindle has to be produced which renders harmless and prevents any axial inaccuracies between cutting spindle and motor shaft, so that shocks exerted upon the cutting spindle and oscillations of the latter no longer act upon the motor shaft. The connection must further be of such type, that it automatically adjusts itself gyroscope-like during the running of the tool into such a position that its central axis or its axis of gravity coincides with the turning axis.

Figure 1:
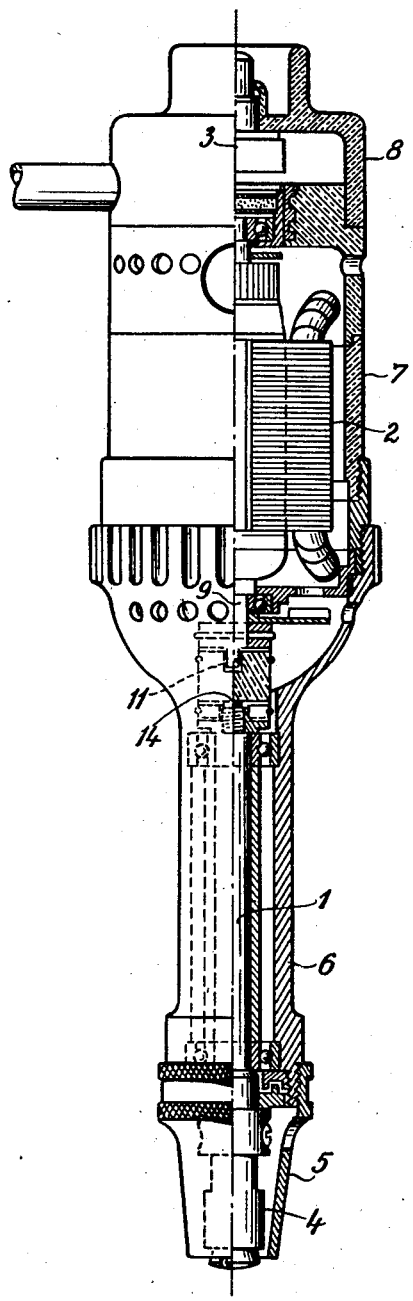
Figure 2:
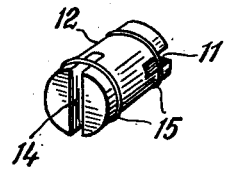
Figure 3:
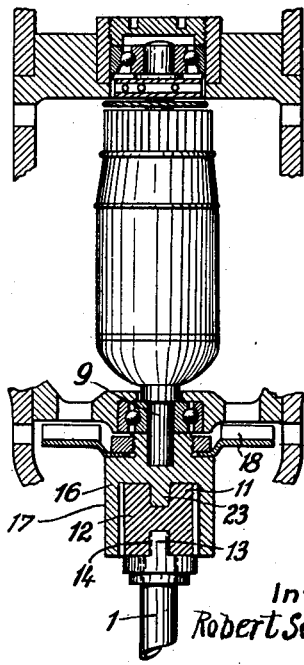

Further characteristic features and advantages of the invention result from the following description and the accompanying drawing in which Fig. 1 shows a small electric machine tool in longitudinal section, Fig. 2 the connecting piece between motor shaft and cutting spindle alone in one form of construction, and Fig. 3 the connecting piece in another form of construction.

The small electric machine tool consists of a spindle 1, a motor 2 and a switch 3. The cutting spindle carries a clamping device 4. These parts are accommodated in a casing of insulating material, which is composed of a protecting sleeve 5 for the clamping device, a casing part 6 for encasing the cutting spindle, a casing part 7 for the motor, and a casing part 8 for the switch. These casing parts are screwed together or connected in any other suitable manner.

The connection of the motor shaft 9 with the cutting spindle 1 is effected by means of a round body 12 made of insulating and slightly yieldable material. This round body or intermediate piece has transverse slits 11 and 14 in its ends into which slits engage tongue-like extensions of the cutting spindle and on the motor shaft. The radial play of the intermediate piece which is due to the transverse slits relative to motor shaft and cutting spindle is limited by an outer ring extending in the range of the slits around the round body.

In the form of construction shown in Figs. 2 and 1, the round body 12 is located freely between the cutting spindle 1 and the motor shaft 9. The radial play is limited by rings 15 which are placed around the insulating intermediate piece in the range of the slits.

In the form of construction shown in Fig. 3, the outer ring is formed by a sleeve 16 mounted on the motor shaft 9 and having an annular skirt 17 and, into which skirt the round body 12 is inserted with play between motor shaft and cutting spindle. The round body 12 is of cylindrical formation and normally loosely fits within the annular skirt 17. The sleeve 16 fixed on the motor shaft 9 has a transverse piece 23 engaging in the transverse slit 11 of the round body, said transverse piece 23 being formed by a tongue in the form of construction shown. The sleeve consists also of insulating material. The sleeve is also carrier of the suction fan 18. The opposite end of the cylindrical body 12 is transversely slitted or grooved as at 14, the slits or grooves 11 and 14 being parallel and the head of the cutting spindle carries a transverse piece or rib 13 engaging the adjacent slit or groove 11.

I claim:

1. A coupling for use between a prime mover and a driven element comprising in combination with axially alined drive and driven shafts, a cup-shaped element having a closed bottom with said bottom axially connected to the drive shaft, a yielding block-like cylindrical body within the cup-shaped element between said drive and driven shafts and having a transverse groove extending completely across each end thereof with the grooves parallel, and a rib on the inner face of the bottom of the cup-shaped element and a rib on the driven shaft respectively extending into the adjacent grooves in said cylindrical body.

2. A coupling as set forth in claim 1, wherein the cylindrical body is formed of cushion material.

3. A small electric machine tool for milling, grinding, drilling and the like, comprising in combination, a motor in the form of a tool, a shaft carried by the motor, a working spindle driven by said motor shaft, a cup-shaped member formed entirely of insulating material open at one end and closed at its other end with the closed end secured to said motor shaft, a solid block-like cylindrical body within said cup-shaped member with the open end of the cup-shaped member and adjacent end of said cylindrical body substantially in the same plane, and central transversely extending interfitting connections between opposite ends of the cylindrical body, the cup-shaped member and said driven shaft extending across the ends of said cylindrical body.

ROBERT SCHUMANN.